United States Patent [19]
Yoshida

[11] Patent Number: 5,585,939
[45] Date of Patent: Dec. 17, 1996

[54] FACSIMILE APPARATUS

[75] Inventor: Takehiro Yoshida, Tokyo, Japan

[73] Assignee: Canon Kabushiki Kaisha, Tokyo, Japan

[21] Appl. No.: 380,632

[22] Filed: Jan. 30, 1995

[30] Foreign Application Priority Data

Jan. 31, 1994 [JP] Japan .................. 6-027246
Jan. 31, 1994 [JP] Japan .................. 6-027247

[51] Int. Cl.⁶ ............................ H04N 1/387; H04N 1/32
[52] U.S. Cl. .................... 358/438; 358/449; 358/297
[58] Field of Search ............................ 358/449, 434, 358/435, 436, 438, 439, 468, 448, 450, 498; 382/296, 297, 295, 293

[56] References Cited

U.S. PATENT DOCUMENTS 4,849,816  7/1989  Yoshida ................................. 358/434
5,128,762  7/1992  Muramatsu et al. ............... 358/498
5,220,431  6/1993  Yamagguchi ........................ 358/449
5,239,388  8/1993  Matsumoto ......................... 358/448

Primary Examiner—Scott A. Rogers
Attorney, Agent, or Firm—Fitzpatrick, Cella, Harper & Scinto

[57] ABSTRACT

A facsimile apparatus having a function of adding communication management information to received information on a receiving station, comprises a first addition unit for adding the communication management information forwardly to a record direction, a second addition unit for adding the communication management information with 90 degrees rotation relative to the record direction, and a selection unit for selecting the addition of the communication management information forwardly to the record direction or the addition of the communication management information with 90 degrees rotation.

6 Claims, 16 Drawing Sheets

| FIG. 1A | FIG. 1B |

FIG. 3 PRIOR ART
MAIN SCAN DIRECTION (RECORDING DIRECTION) →
SUB-SCAN DIRECTION ↓
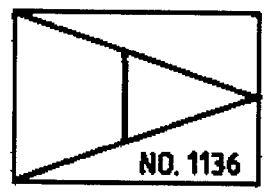
NO. 1136
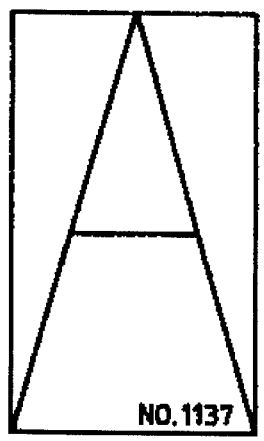
NO. 1137
FIG. 4A
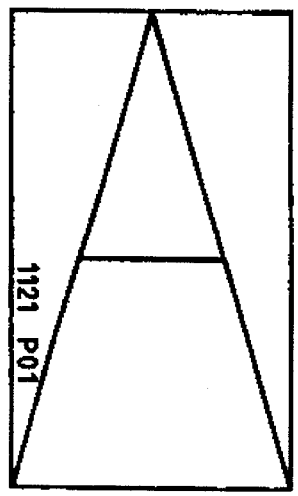
FIG. 4B
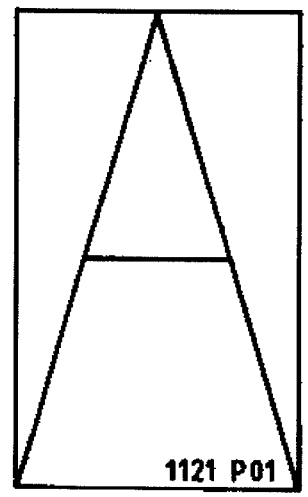

(TOP)

(BOTTOM)

(LEFT SIDE)

(RIGHT SIDE)

FACSIMILE APPARATUS

BACKGROUND OF THE INVENTION

1. Field of the Invention

The present invention relates to a facsimile apparatus having a function to add communication management information to received information (hereinafter referred to a receiving footer function).

The present invention also relates to a facsimile apparatus having a function to add sending station information.

2. Related Background Art

In a prior art facsimile apparatus having a receiving footer function, the receiving footer information is recorded by adding it to a specified position on a record sheet.

However, in a facsimile apparatus which records along a longitudinal side of a size A4 sheet, when the receiving footer is added forwardly to the record direction, the receiving footer on the size A4 record sheet is rotated by 90 degrees relative to the information on the record sheet as shown in FIG. 3. For a size A3 record sheet, the receiving footer is added forwardly to the information on the record sheet.

In the prior art facsimile apparatus, when a document sheet to be transmitted is set to a read unit and a transmission command is issued, the document sheet is fed one at a time and an image is sequentially read from a head along the feed direction. When the sending station information is to be added to the read image, it is always added to the head of the image read by the read unit. The sending station information may be added by inserting it before the head image information or superimposing it on several lines of head image information.

In the prior art facsimile apparatus of general type, it is common that a document sheet is inserted to the read unit starting from an upper end of each sheet, and the sending station information is added to the image information read in such a set state at the upper end of each sheet.

However, as shown in FIG. 10, in a facsimile apparatus in which a read width of the read unit and an output width of a record unit are set to 297 mm equal to the longitudinal length of the size A4 sheet, the size A4 document sheet and record sheet are set to be fed laterally, and the size A3 document sheet and record sheet are set to be fed longitudinally, the sending station information is added to the longitudinal head as it is in a conventional facsimile apparatus for the size A3 document sheet which is fed longitudinally as shown in FIGS. 15A and 15B, but the sending station information is added to the lateral head for the size A4 document sheet. Thus, the position of the sending station information added to the size A4 sheet is not proper.

SUMMARY OF THE INVENTION

It is an object of the present invention to improve a facsimile apparatus.

It is another object of the present invention to provide a facsimile apparatus which can add a receiving footer in a proper direction.

It is a still another object of the present invention to provide a facsimile apparatus which can properly add sending station information relative to a record direction by reading a size of a sheet.

BRIEF DESCRIPTION OF THE DRAWINGS

FIG. 3 illustrates the addition of a receiving footer in a prior art facsimile apparatus, FIGS. 4A and 4B illustrate the addition of the receiving footer in the first embodiment.

DETAILED DESCRIPTION OF THE PREFERRED EMBODIMENTS

Figures 1, 1A:
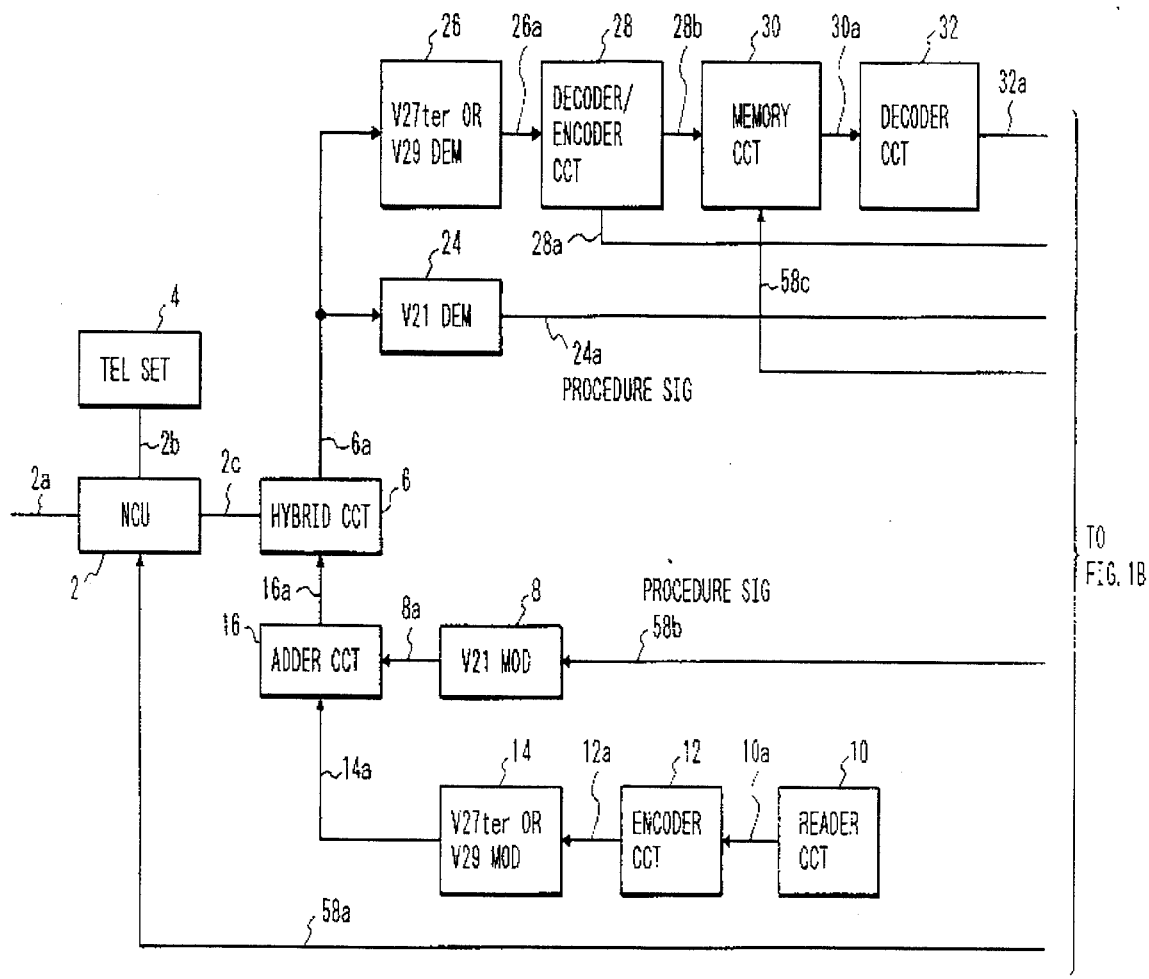
FIG. 1 is comprised of FIG. 1A and FIG. 1B showing a block diagram of a facsimile apparatus in accordance with a first embodiment of the present invention.
Figure 1B:
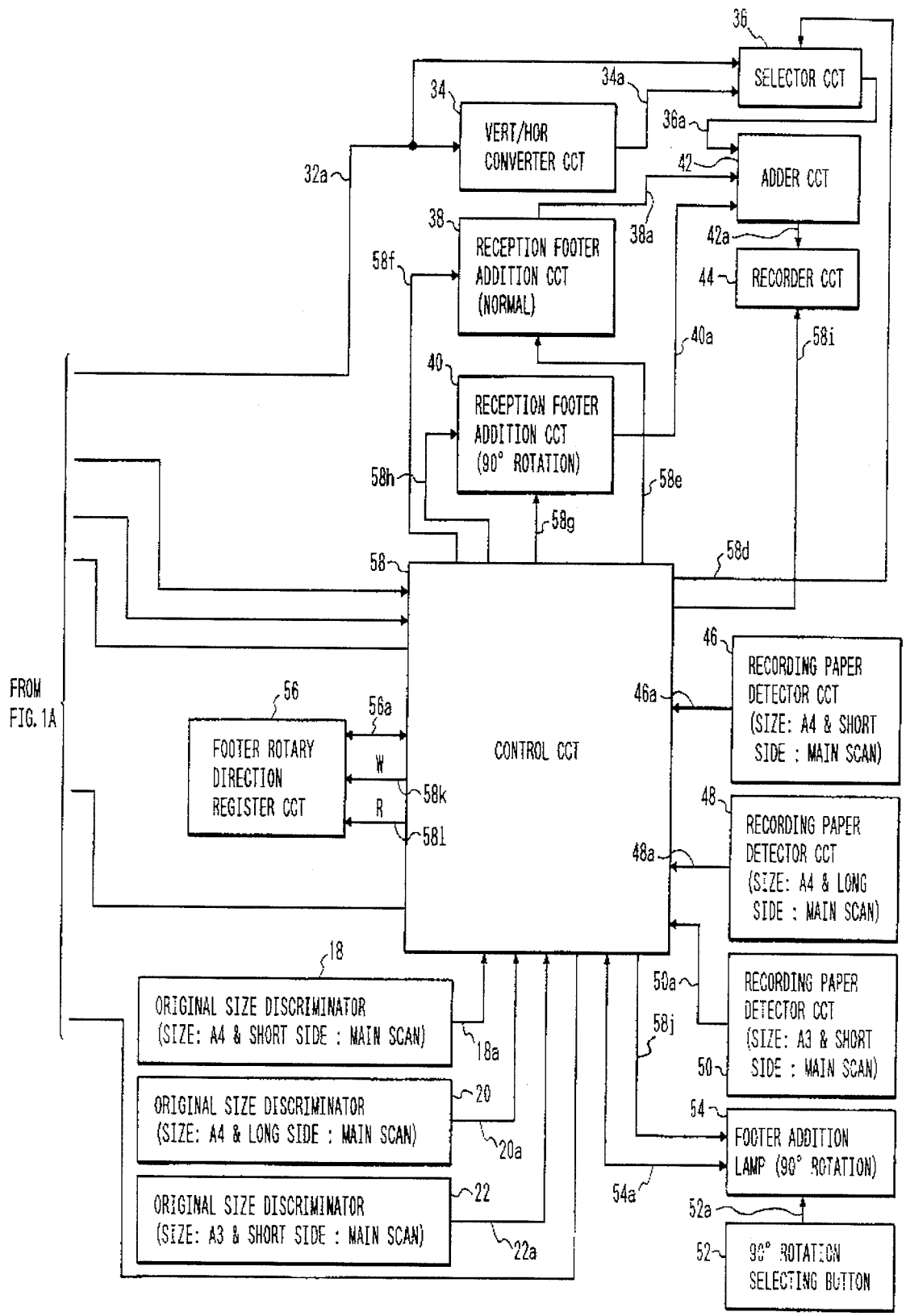

FIGS. 1A and 1B show block diagram of a facsimile apparatus in accordance with a first embodiment of the present invention.

An NCU (network control unit) 2 connects a telephone network to a terminal of a line for use in data communication, controls the connection of a telephone switching network, switches into a data communication line and holds a loop. The NCU 2 also connects a telephone line 2a to a telephone set 4 when a signal level from a control circuit 58 (signal line 58a) is '0', and connects the telephone line 2a to a facsimile apparatus when the signal level is '1'. In a normal state, the telephone line 2a is connected to the telephone line 4.

A hybrid circuit 6 separates a transmitting signal from a receiving signal, transmits the transmitting signal from an adder circuit 16 to the telephone line 2a via the NCU 2, receives a signal from a destination station via the NCU 2 and sends it to a V29 demodulator 26 and a V21 demodulator 24 via the signal line 6a.

A V21 modulator 8 modulates a signal in accordance with the known CCITT Recommendation V21. It modulates a protocol signal (signal line 58b) from the control circuit 58 and sends it out to the adder circuit 16 through a signal line 8a.

A reader circuit 10 sequentially reads one main scan line of image signal from a transmitting document sheet, produces a signal train representing black and white binary levels and sends the data to an encoder circuit 12 from a signal line 10*a*. It comprises an image pickup device such as a CCD (charge coupled device).

The encoder circuit 12 receives the read data on the signal line 10*a*, encodes it (by the MH encoding or the MR encoding) and outputs it from a signal line 12*a*.

A V27 ter or V29 modulator 14 receives the encoded data from the signal line 12*a*, modulates it in accordance with the known CCITT Recommendation V27 ter (differential phase modulation) or V29 (quadrature modulation), and outputs the modulated data to the adder circuit 16 through a signal line 14*a*.

The adder circuit 16 adds the outputs of the modulators 8 and 14. The output of the adder circuit 16 is sent to the hybrid circuit 6.

Discrimination circuits 18 to 22 determine a size of a document sheet set on a document sheet table. When the document sheet size is A4 and the main scan direction extends along a lateral (or short) side or the read direction, and a transmission direction is along the lateral side, it outputs a signal level '1' to the signal line 18*a* and a signal level '0' to the signal line 20*a* and 22*a*. When the document sheet size is A4 and the main scan direction is along the longitudinal (or long) side or the read direction and the transmission direction is along the longitudinal side, it outputs the signal level '1' to the signal line 20*a* and the signal level '0' to the signal lines 18*a* and 22*a*. When the document sheet size is A3 and the main scan direction is along the lateral side or the read direction and the transmission direction is along the lateral side, it outputs the signal level '1' to the signal line 22*a* and the signal level '0' to the signal line 20*a*.

A V21 demodulator 24 demodulates a signal in accordance with the known CCITT Recommendation V21. The demodulator 24 receives a protocol signal from the hybrid circuit 6 through the signal line 6*a*, V21 demodulates it and sends it to the control circuit 58 through a signal line 24*a*.

A V27 ter or V29 modulator 26 demodulates a signal in accordance with the known CCITT Recommendation V27 ter or V29. The demodulator 26 receives the modulated image signal from the hybrid circuit 6, demodulates it and sends the demodulated data to a decoder/encoder circuit 28 through a signal line 26*a*.

The decoder/encoder circuit 28 decodes the demodulated data outputted to the signal line 26*a*, outputs the decoded data to the control circuit 58 through a signal line 28*a*, encodes the decoded data with K=8 and outputs the encoded data to a memory circuit 30 through a signal line 28*b*.

The memory circuit 30 stores the demodulated data outputted to the signal line 28*b* under the control of the control circuit 58 through a signal line 58*c* and sends the stored data to a decoder circuit 32 through a signal line 30*a*.

The decoder circuit 32 decodes (by the MH decoding or the MR decoding) the data from the signal line 30*a* and outputs the decoded data to a vertical/horizontal converter circuit 34 and a selector circuit 36 through a signal line 32*a*.

The vertical/horizontal convertor circuit 34 outputs the information outputted to the signal line 32*a* and rotated by 90 degrees to a signal line 34*a*.

The selector circuit 36 connects the signal line 32*a* to a signal line 36*a* when the signal level '0' is outputted to a signal line 58*d*, and connects the signal line 34*a* to the signal line 36*a* when the signal level '1' is outputted to the signal line 58*d*.

An addition circuit 38 adds a receiving footer forwardly or normally to the record direction. When a receiving footer output pulse is produced on a signal line 58*f*, the addition circuit 38 receives the addition information outputted on a signal line 58*e*, converts it to a dot pattern, and outputs the receiving footer information forwardly to the record direction to a signal line 38*a* in synchronism with the record line information.

An addition circuit 40 adds the receiving footer in a direction rotated by 90 degrees to the record direction. When a receiving footer output pulse is produced on a signal line 58*h*, the addition circuit 40 receives the addition information outputted to a signal line 56*g*, converts it to a dot pattern and outputs the receiving footer information to the signal line in the direction rotated by 90 degrees to the record direction in synchronism with the record line information.

An adder circuit 42 receives the signals of the signal lines 36*a*, 38*a* and a signal line 40*a* and outputs sum information to a signal line 42*a*.

A recorder circuit 44 sequentially receives the information outputted to the signal line 42*a* one line at a time and records it. When the signal '0' is outputted to a signal line 58*i*, it records on the A4 record sheet with the lateral side along the main scan direction as a line, and when the signal '1' is outputted to the signal line 58*i*, it records on the A4 record sheet with the longitudinal side along the main scan direction as a line, and when the signal '2' is outputted to the signal line 58*i*, it records on the A3 record sheet with the lateral side along the main scan direction as a line.

A detector circuit 46 detects the presence or absence of the A4 record sheet to be recorded from the lateral (or short) side along the main scan direction. If such a record sheet is detected, it outputs a signal level '1' to a signal line 46*a*, and if the sheet is not detected, it outputs a signal level '0' to the signal line 46*a*.

A detector circuit 48 detects the presence or absence of the A4 record sheet to be recorded from the longitudinal (or long) side along the main scan direction. If such a sheet is detected, it outputs the signal level '1' to a signal line 48*a*, and if the sheet is not detected, it outputs the signal level '0' to the signal line 48*a*.

A detector circuit 50 detects the presence or absence of the A3 record sheet to be recorded from the lateral side along the main scan direction. If such a sheet is detected, it outputs the signal level '1' to a signal line 50*a*, and if the sheet is not detected, it outputs the signal level '0' to the signal line 50*a*.

A selecting button 52 selects the addition of the receiving footer with 90 degrees rotation. When the button 52 is depressed, a depression pulse is produced on a signal line 52*a*.

A lamp 54 indicates the addition of the receiving footer with the 90 degrees rotation. When a clear pulse is generated on a signal line 58*j*, the lamp 54 is turned off and it subsequently repeats the on-off-on each time the depression pulse is produced on the signal line 52*a*. When the lamp 54 is on, the signal level '1' is outputted to a signal line 54*a*, and when the lamp 54 is off, the signal level '0' is outputted to the signal line 54*a*.

A registration circuit 56 registers the rotation direction of the receiving footer relative to the record sheet. Specifically, the record sheet is the A4 record sheet to be recorded from the lateral side along the main scan direction, the A4 record sheet to be recorded from the longitudinal side along the main scan direction, or the A3 record sheet to be recorded from the lateral side along the main scan direction, and they are designated by record sheet 0, record sheet 1 and record sheet 2, respectively.

When it is registered in the registration circuit 56, a type of the record sheet (for example, record sheet 2), a space and a direction of rotation of the receiving footer (for example, 90 degrees rotation) are outputted to a signal line 56a and a write pulse is generated on a signal line 58k. When the information registered in the registration circuit 58 is to be read, the type of the record sheet (for example, record sheet 2) is outputted to the signal line 56a and a read pulse is generated on a signal line 58i. Thus, the information registered in the registration circuit 56, particularly the 90 degrees rotation information is outputted to the signal line 56a. The registration of the information is conducted by a circuit, not shown.

In the first embodiment of the present invention, the control circuit 58 controls the addition of the receiving footer to the received information in a receiving station, and a mode in which the receiving footer is added forwardly to the record direction and a mode in which the receiving footer is added in the 90 degrees rotated direction to the record direction is selected by an input from selection means of a console unit, not shown. It is now assumed that the record sheet is of one type. Specifically, it is the A4 record sheet on which the recording is made from the lateral side along the main scan direction.

Figure 2:
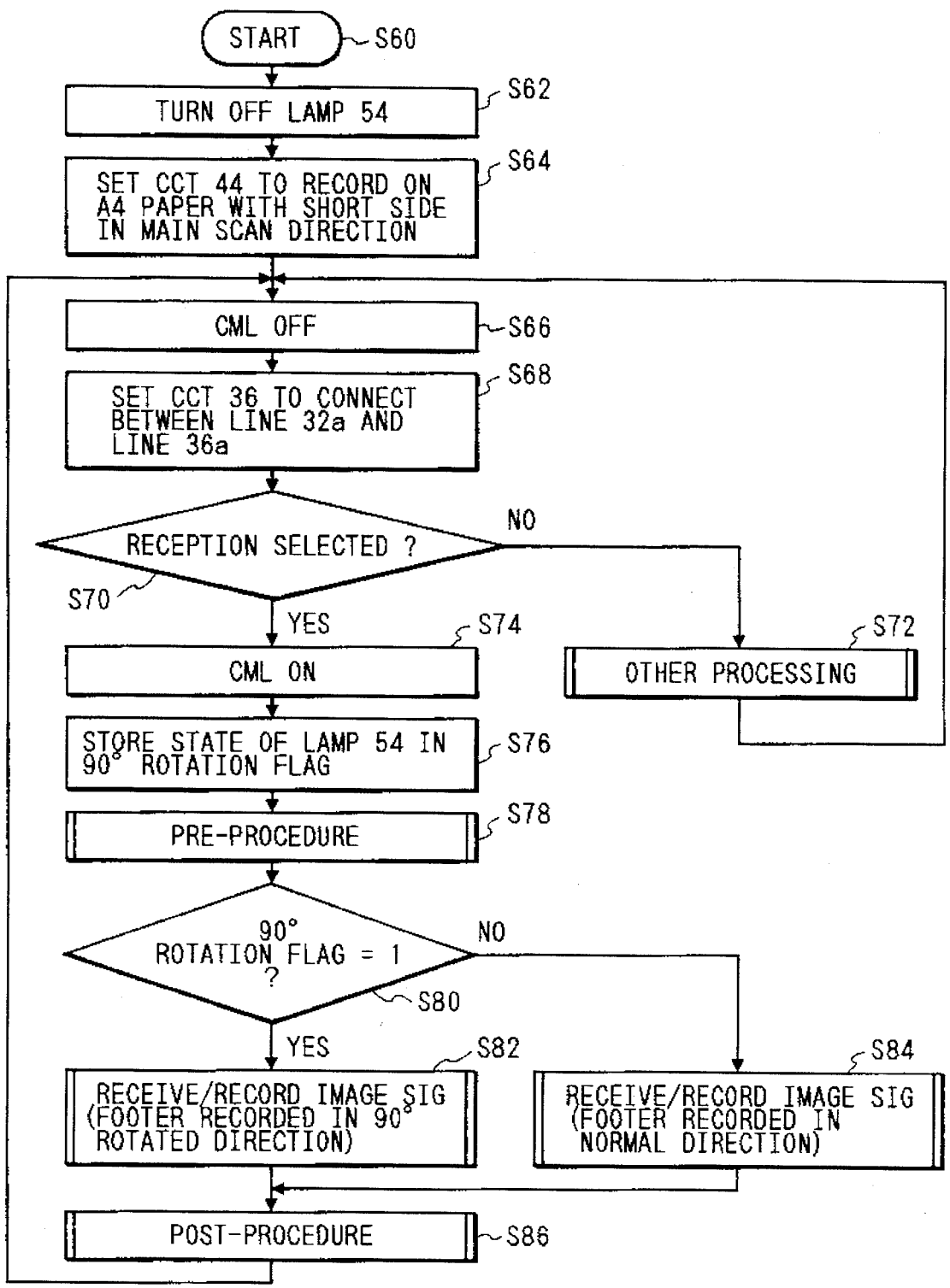
FIG. 2 shows a flow chart of an operation of the first embodiment.

FIG. 2 shows a flow chart of an operation of the control circuit 58 in the first embodiment of the present invention.

In S62, a clear pulse is generated on the signal line 58j so that the lamp 54 which indicates the addition of the receiving footer in the 90 degrees rotated direction is turned off. In S64, the signal '0' is outputted to the signal line 58i to set the A4 record sheet with the recording from the lateral side along the main scan direction in the record circuit 44. It is assumed that only one type of record sheet can be set in the facsimile apparatus.

In S66, the signal level '0' is outputted to the signal line 58a to turn off the CML. In S68, the signal level '0' is outputted to the signal line 58d to set no execution of vertical/horizontal conversion of the decoded data, that is, connection of the signal on the signal line 32a to the signal line 36a. It is assumed that the facsimile apparatus does not conduct the vertical/horizontal conversion of the received information.

In S70, whether the reception has been selected or not is determined. If the reception is selected, the process proceeds to S74, and if the reception is not selected, the process proceeds to S72 to conduct other process.

In S74, the signal level '1' is outputted to the signal line 58a to turn on the CML. In S76, the signal on the signal line 54a is received and the lamp state indicating the addition of the receiving footer with the 90 degrees rotation is received and it is stored in a 90 degrees rotation flag. In S78, a pre-protocol is conducted. The provision of only the A4 record sheet is informed to the transmitting station.

In S80, whether the 90 degrees rotation flag is '1' or not, that is, whether the addition of the receiving footer with the 90 degrees rotation has been selected or not at the start of communication is determined. If the addition of the receiving footer with the 90 degrees rotation has been selected by the console unit, the process proceeds to S82, and if it has not been selected, the process proceeds to S84.

In S82, the image signal is received and recorded. A communication number and communication page information are outputted, for each page, to the signal line 58g, and a receiving footer addition pulse is generated on the signal line 58h at a timing of the left bottom of the record sheet so that the receiving footer is recorded at the left bottom of the record sheet with the 90 degrees rotation. A specific example thereof is shown in FIG. 4A (A4 record sheet).

In S84, the image signal is received and recorded. A communication number and communication page information are outputted, for each page, to the signal line 58e, and a receiving footer addition pulse is generated to the signal line 58f at a timing of the right bottom of the record sheet to forwardly record the receiving footer at the right bottom of the record sheet. A specific example thereof is shown in FIG. 4B (A4 record sheet).

Then, in S86, a post-protocol is conducted and the process returns to S66.

In a second embodiment of the facsimile apparatus of the present invention which allows the setting of a plurality of types of record sheets, whether the receiving footer is to be added to the record sheet forwardly to the record direction or with the 90 degrees rotation is registered, and the direction of the addition of the receiving footer relative to the record direction is determined based on the registered information. It is assumed that the record sheets are the A4 record sheet with the longitudinal side being along the main scan direction or the record direction, and the A3 record sheet with the lateral side being along the main scan direction or the record direction.

Figure 5:
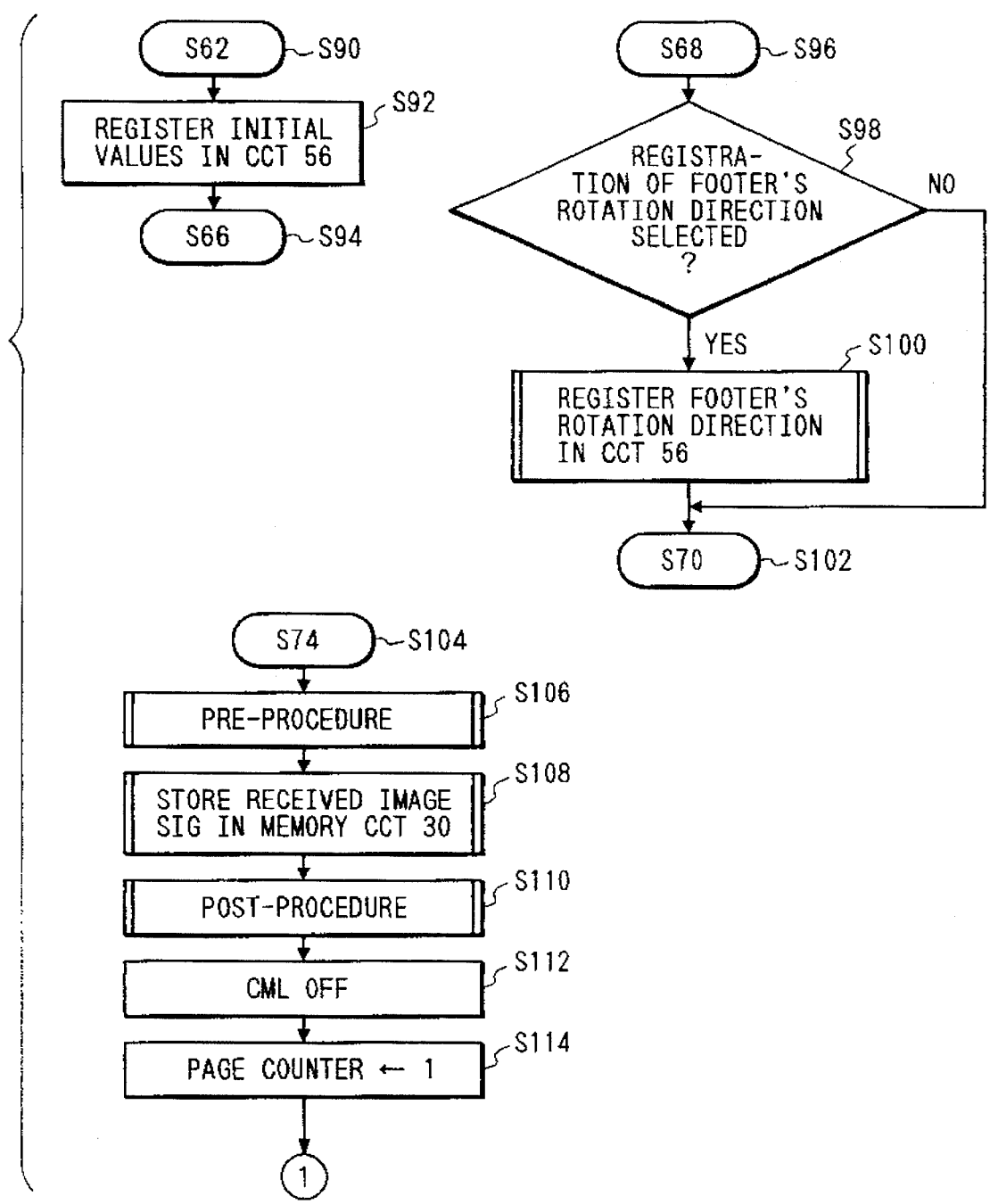
FIG. 5 shows a flow chart of an operation of a second embodiment.
Figure 6:
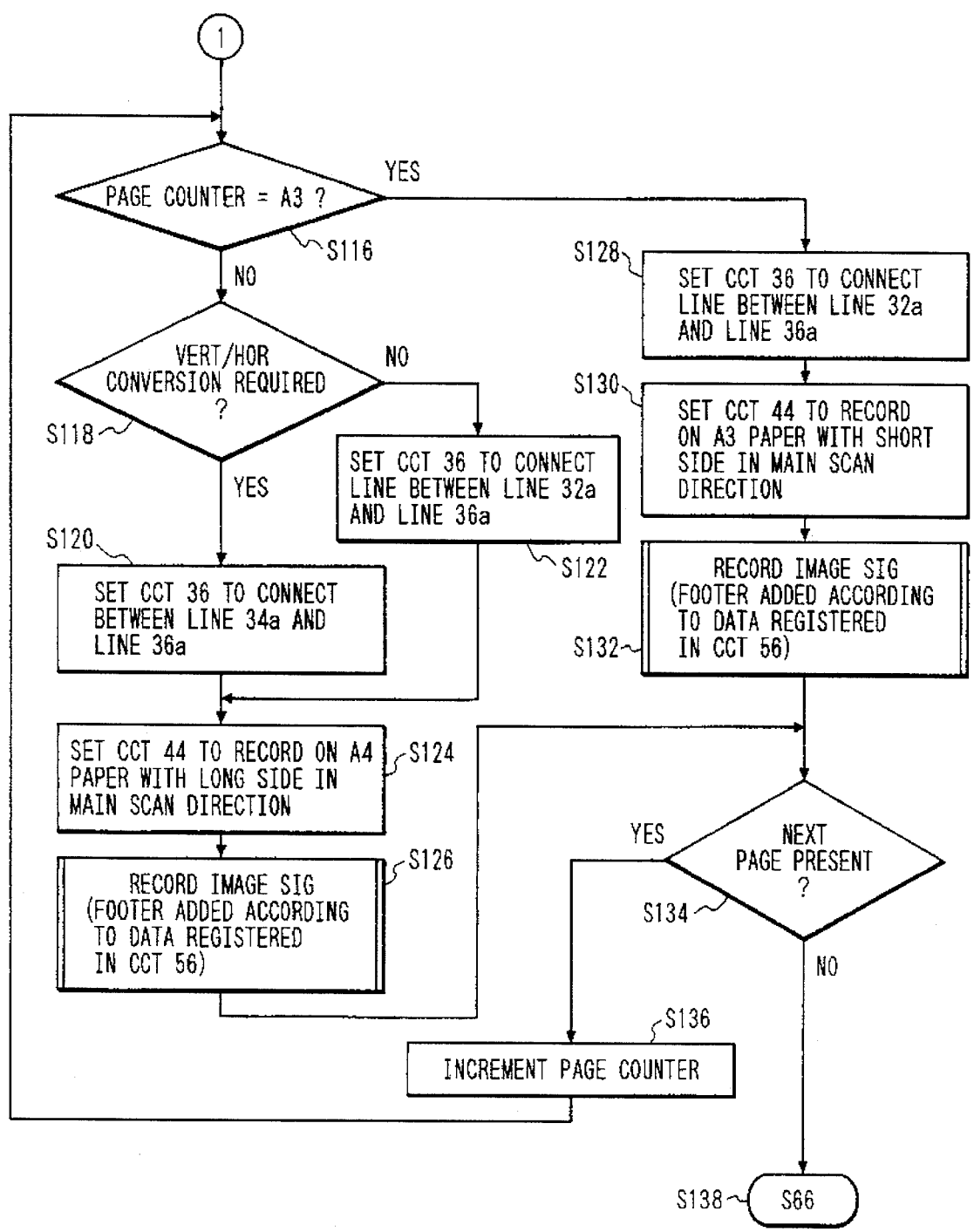
FIG. 6 shows a flow chart of an operation of the second embodiment.

FIGS. 5 and 6 show flow charts of a portion of an operation of the second embodiment which is different from that of the first embodiment.

S90 corresponds to S62. In S92, the addition of the receiving footer with the 90 degrees rotation for the A4 record sheet to be recorded from the longitudinal side along the main scan direction, and the addition of the receiving footer as it is to the A3 record sheet to be recorded from the lateral side along the main scan direction are registered in the registration circuit 56 as the initial values. Then, in S94, the process proceeds to S66.

S96 corresponds to S68. In S98, whether the registration of the direction of rotation of the receiving footer has been selected or not for the record sheet is determined, and if the registration is selected, the process proceeds to S100, and if the registration is not selected, the process proceeds to S102 (corresponding to S70).

In S100, the direction of rotation of the receiving footer for the record sheet is registered in the registration circuit 56. Then, the process proceeds to S102 (corresponding to S70).

S104 corresponds to S74. In a pre-protocol in S106, the A4 record sheet and the A3 record sheet are informed. Then, in S108, the received information is stored in the memory circuit through the signal line 58c.

In S1110, a post-protocol is conducted. In S1112, the signal level '0' is outputted to the signal line 58a to turn off the CML. In S114, '1' is set to a page counter.

In S116, whether the page number information of the page counter is for A3 or not is determined. If it is for A3, the process proceeds to S128, and if it is for A4, the process proceeds to S118.

In S118, whether the vertical/horizontal conversion of the received information is required or not is determined, and if it is not required, the process proceeds to S122, and if it is required, the process proceeds to S120.

In S120, the signal level '1' is outputted to the signal line 58d and the selector circuit 36 sets to connect the signal line 34a and the signal line 36a.

In S122, the signal level '0' is outputted to the signal line 58d and the selector circuit 36 sets to connect the signal line 32a and the signal line 36a.

In S124, the signal level '1' is outputted to the signal line 58*i* to set the recording on the A4 record sheet from the longitudinal side along the main scan direction in the recorder circuit 44. In S126, the information in the memory circuit 30 is recorded. The receiving footer including the communication number and the communication page information for each page is added in accordance with the information registered in the registration circuit 56. The initial value is the recording with the 90 degrees rotation relative to the record direction at the left bottom of the record sheet.

On the other hand, in S128, the signal level '0' is outputted to the signal line 58*d* and the selector circuit 36 sets to connect the signal line 32*a* to the signal line 36*a*. In S130, the signal '2' is outputted to the signal line 58*i* to set the recording on the A3 record sheet from the lateral side along the main scan direction in the recorder circuit 44.

In S132, the information in the memory circuit 30 is recorded. The receiving footer including the communication number and the communication page information for each page is added in accordance with the information recorded in the registration circuit 56. The initial value is the forward recording relative to the record direction at the right bottom of the record sheet.

Then, in S134, whether a next page is present or not is determined. If the next page is present, the process proceeds to S136 to increment the page counter by one and the process returns to S116. If the next page is not present, the process proceeds to S138 (corresponding to S66).

Figure 7:
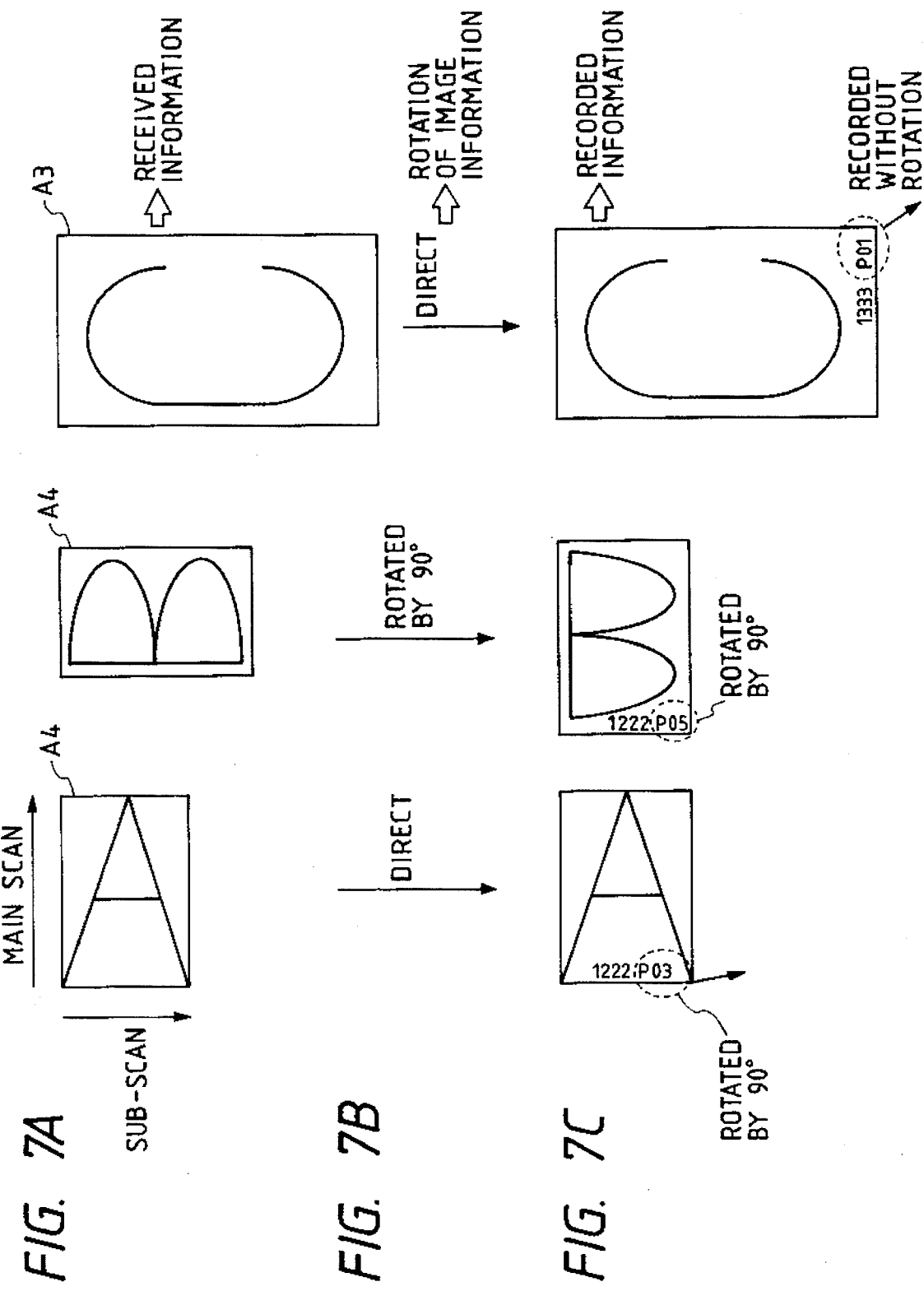
FIGS. 7A to 7C illustrate the addition of the receiving footer in the second embodiment.

FIGS. 7A to 7C illustrate a record having the receiving footer of the received information added in accordance with the initial value registered in the registration circuit 56.

FIG. 7A represents received information and FIG. 7B represents the direction of rotation of the received information. FIG. 7C represents the addition of the receiving footer as a record of the information. As shown, for the A4 record sheet, the receiving footer is added with the 90 degrees rotation at the left bottom of the record sheet, and for the A3 record sheet, the receiving footer is added without rotation at the right bottom of the record sheet.

A third embodiment of the present invention is now explained.

The third embodiment comprises means for designating from the transmitting station, whether the receiving footer is added forwardly to the transmission direction of the image information, whether it is added with the 90 degrees rotation relative to the transmission direction of the image signal, or whether it is added, and means for informing the designation information to the receiving station, which sets the direction of addition of the receiving footer relative to the record direction in accordance with the designation information and the information as to whether it is recorded with the vertical/horizontal conversion.

In the transmitting station, when the length along the main scan direction is shorter than the length along the sub-scan direction, the setting is such that the receiving footer is added forwardly to the transmission direction of the image signal, and if the length along the main scan direction is longer than the direction along the sub-scan direction, the setting is such that the receiving footer is added with the 90 degrees rotation to the transmission direction of the image signal.

Figure 8:
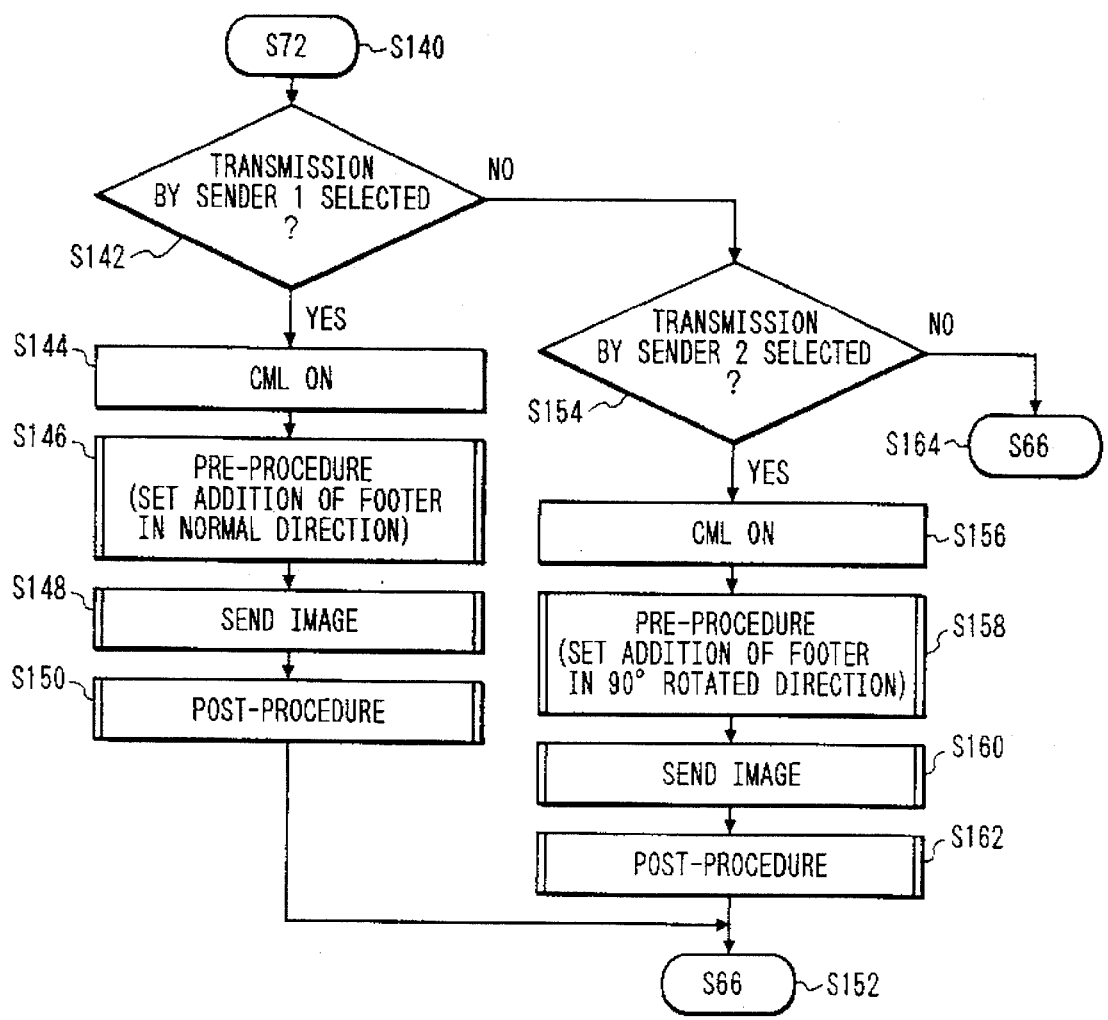
FIG. 8 shows a flow chart of an operation of a third embodiment.
Figure 9:
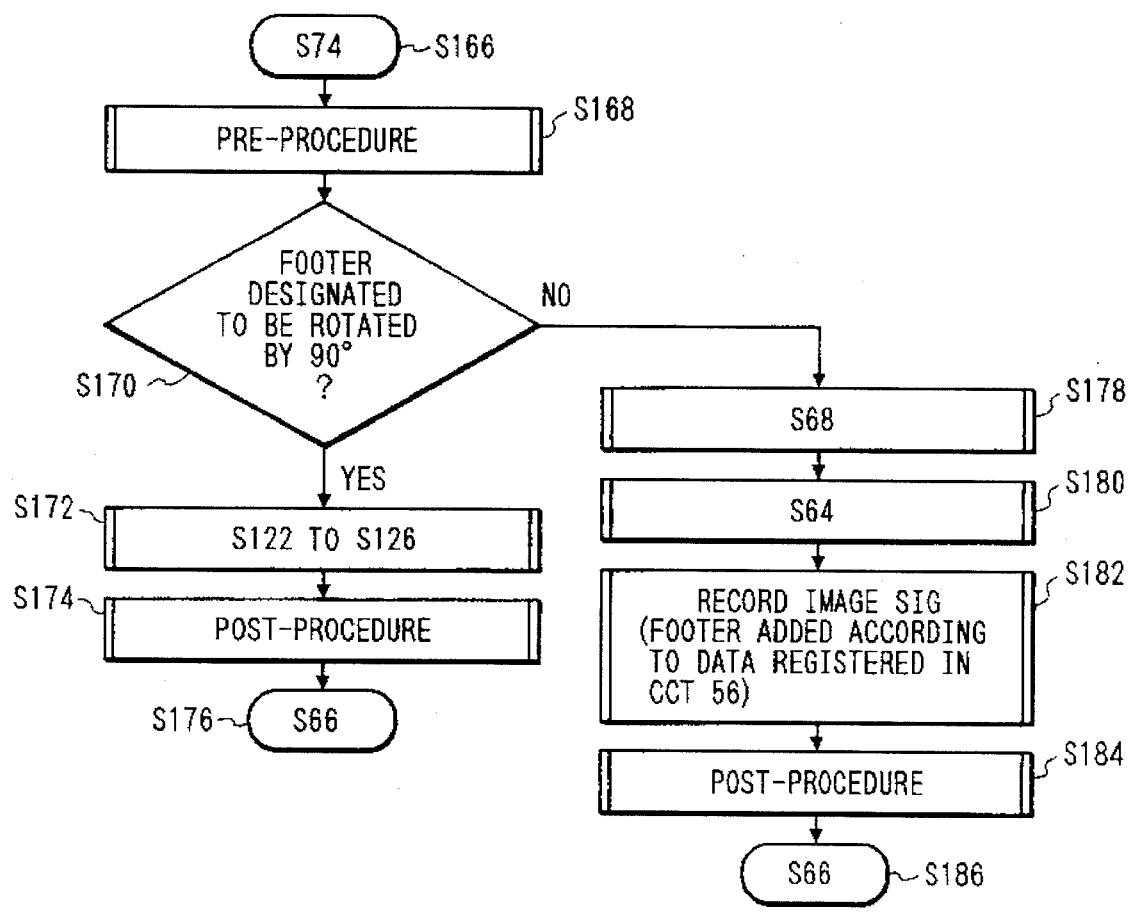
FIG. 9 shows a flow chart of an operation of the third embodiment.

FIGS. 8 and 9 show flow charts of a portion of an operation of the third embodiment which is different from that of the first embodiment.

It is assumed that the transmitting station comprises a facsimile apparatus which transmits the A4 image from only the lateral side as the main scan direction and a facsimile apparatus which transmits the A4 image from only the longitudinal side as the main scan direction, and the reception from those two facsimile apparatus is explained.

S140 corresponds to S72. In S142, whether the transmission from the transmitter 1 (for the transmission of the A4 image from the lateral side along the main scan direction) has been selected or not is determined. If it is selected, the process proceeds to S144, and if it is not selected, the process proceeds to S154.

In S144, the signal level '1' is outputted to the signal line 58*a* to turn on the CML. In S146, a pre-protocol is conducted. The setting of the addition of the receiving footer forwardly to the transmission direction of the image information is informed to the receiving station.

In S148, the image is transmitted. The image information is received from the lateral side along the main scan direction of the A4 image. In S150, a post-protocol is conducted and in S152, the process proceeds to S66.

In S154, whether the transmission from the transmitter 2 (for the transmission of the A4 image from the longitudinal side along the main scan direction) has been selected is determined. If it is selected, the process proceeds to S156, and if it is not selected, the process proceeds to S164.

In S156, the signal level '1' is outputted to the signal line 58*a* to turn on the CML. In S158, a pre-protocol is conducted. The setting of the addition of the receiving footer with the 90 degrees rotation to the transmission direction of the image information is informed to the receiving station.

In S160, the image is transmitted. The image information is transmitted from the longitudinal side along the main scan direction of the A4 image. In S162, a post-protocol is conducted. In S164, the process proceeds to S66.

S166 corresponds to S74. In S168, a pre-protocol is conducted. The ready state of the recording on the A4 record sheet is informed to the transmitting station transmitter. The availability of the reception of the A4 image information from the lateral side along the main scan direction and the reception of the A4 image information from the longitudinal side along the main scan direction is also informed.

In S170, whether the 90 degrees rotation has been designated for the direction of the receiving footer from the transmitter is determined. If it is designated, the process proceeds to S172, and if it is not designated, the process proceeds to S178.

In S172, the process of S122, S124 and S126 is conducted. In S174, a post-protocol is conducted. In S176, the process proceeds to S66.

In S178, the process of S68 is conducted. In S180, the process of S64 is conducted. In S182, the image signal is recorded. The receiving footer including the communication number and the communication page information for each page is added in accordance with the information registered in the registration circuit 56. Specifically, it is added forwardly to the record direction at the right bottom of the record sheet.

In S184, a post protocol is conducted and in S186, the process proceeds to S66.

In accordance with the present embodiment, the receiving footers can be added in the proper direction on a plurality of types of record sheets and a convenient apparatus can be provided.

Figure 10:
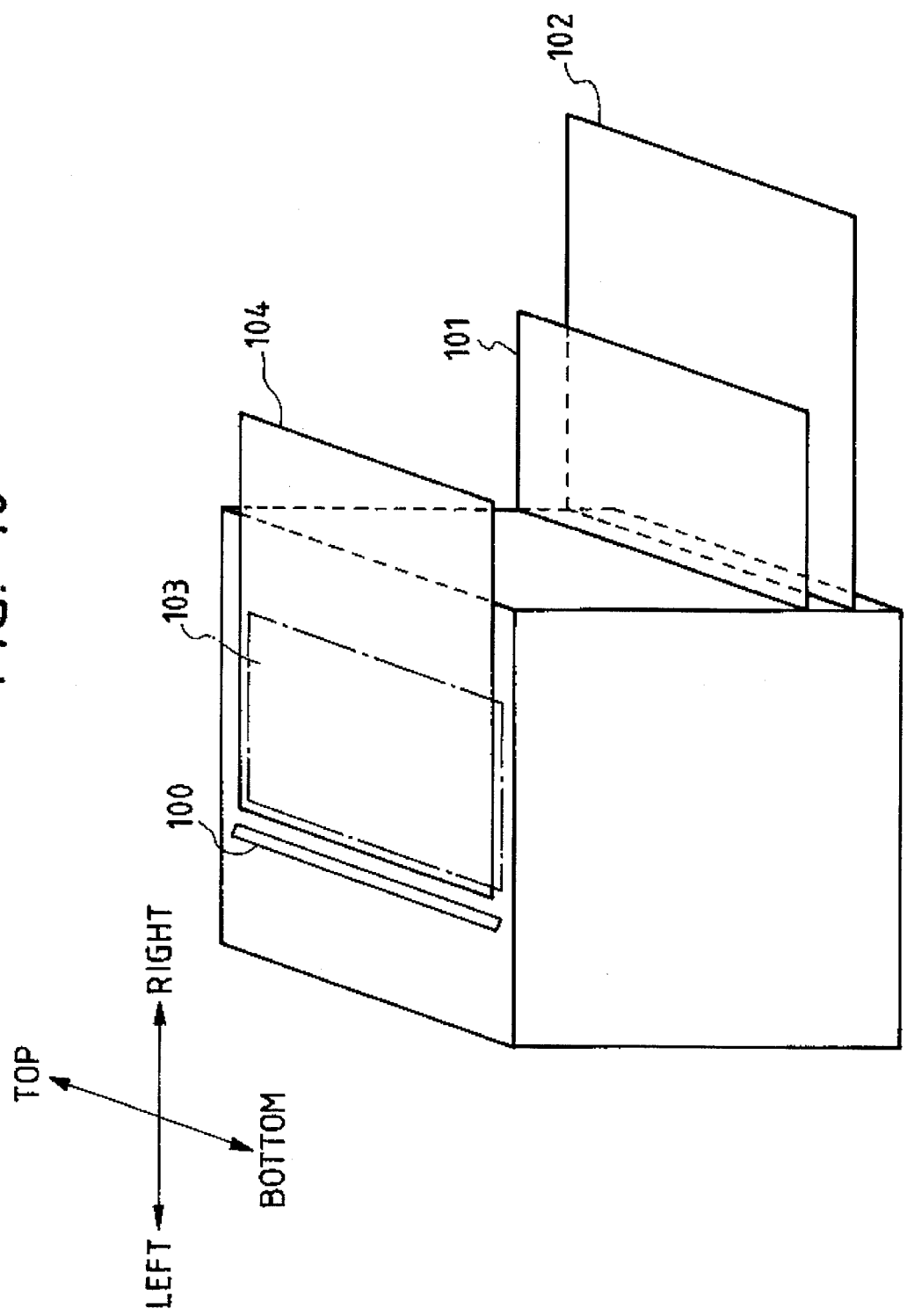
FIG. 10 shows a perspective view for illustrating a setting method of a document sheet and a record sheet in a facsimile apparatus in accordance with a fourth embodiment.

FIG. 10 shows a perspective view illustrating a method for setting the document sheet and the record sheet of the facsimile apparatus in a fourth embodiment of the present invention. In the drawing, numeral 100 denotes a reading means; 101, an A4 size cassette; 102, an A3 size cassette; 103, an A4 size document sheet; and 104, an A3 size document sheet.

As shown, in the facsimile apparatus of the present embodiment, the read width of the read unit and the output width of the record unit are 297 mm which corresponds to the longitudinal length of the A4 sheet, and the document sheet and the record sheet of the size A4 are fed laterally and the document sheet and the record sheet of the size A3 are fed longitudinally. Thus, the document sheet and the record sheet of the size A4 are fed laterally for reading and recording so that faster reading and recording than those when the sheet is fed longitudinally are attained.

Figures 11, 11A:
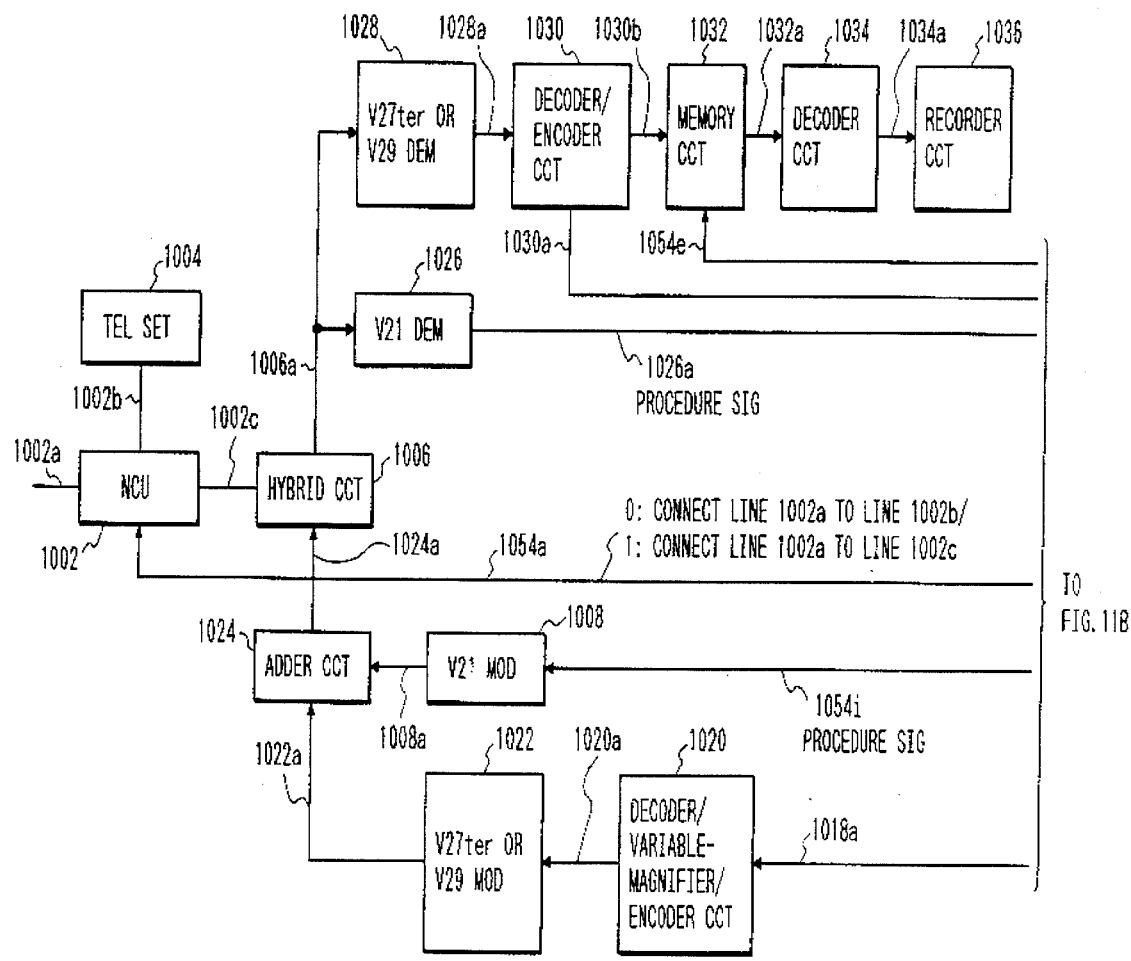
FIG. 11 is comprised of FIG. 11A and FIG. 11B showing a block diagram of a configuration of the facsimile apparatus of the fourth embodiment.
Figure 11B:
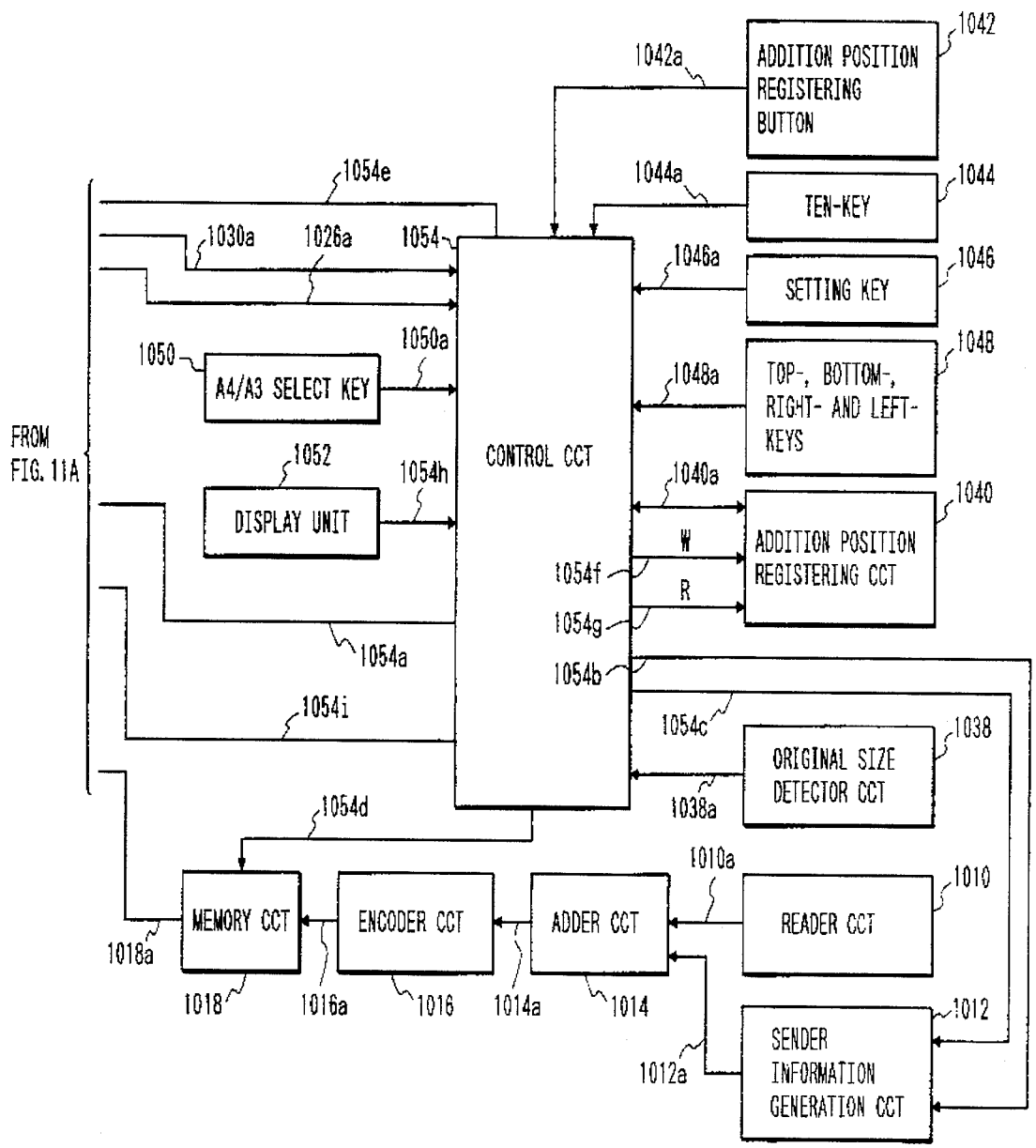

FIGS. 11A and 11B show a block diagram of a configuration of the facsimile apparatus in accordance with the present embodiment.

An NCU (network control unit) 1002 connects a telephone network to a terminal of a line for use in data communication, controls the connection of a telephone switching network, switches into a data communication line and holds a loop. The NCU 1002 also connects a telephone line 1002a to a telephone set 1004 when a signal level from a control circuit 1054 (signal line 1054a) is '0', and connects the telephone line 1002a to a facsimile apparatus when the signal level is '1'. In a normal state, the telephone line 1002a is connected to a telephone line 1004.

A hybrid circuit 1006 separates a transmitting signal from a receiving signal, transmits the transmitting signal from an adder circuit 1024 to the telephone line 1002a via the NCU 1002, receives a signal from a destination station via the NCU 1002 and sends it to a V29 demodulator 1028 and a V21 demodulator 1026 via a signal line 1006a.

A V21 modulator 1008 modulates a signal in accordance with the known CCITT Recommendation V21. It modulates a protocol signal (signal line 1054i) from the control circuit 1054 and sends it out to the adder circuit 1024 through a signal line 1008a.

A reader circuit 1010 sequentially reads one main scan line of image signal from a transmitting document sheet, produces a signal train representing black and white binary levels and sends the data to a signal line 1010a. The reader circuit can read over 297 mm length. Namely, as shown in FIG. 10, for the size A4, the longitudinal side is along the main scan direction, and for the size A3, the lateral side is along the main scan direction. The read data is encoded and transmitted without rotation.

A sending station information generation circuit 1012 receives the signal on a signal line 1054b when the signal level '1' is outputted from the control circuit 1054 to a signal line 1054c, and when the signal '0' is outputted, it outputs a signal in synchronism with the reader circuit 1010 to add the sending station information at the top as shown in FIG. 10, and when the signal '1' is outputted, it outputs the signal in synchronism with the reader circuit 1010 to add the sending station information on the left as shown in FIG. 10, and when the signal '2' is outputted, it outputs the signal in synchronism with the reader circuit 1010 to add the sending station information at the bottom as shown in FIG. 10, and when the signal '3' is outputted, it outputs the signal in synchronism with the reader circuit 1010 to add the sending station information on the right as shown in FIG. 10.

FIGS. 12A to 12D illustrate the addition of the document sheet information and the sending station information in the present embodiment.

Figure 12A:
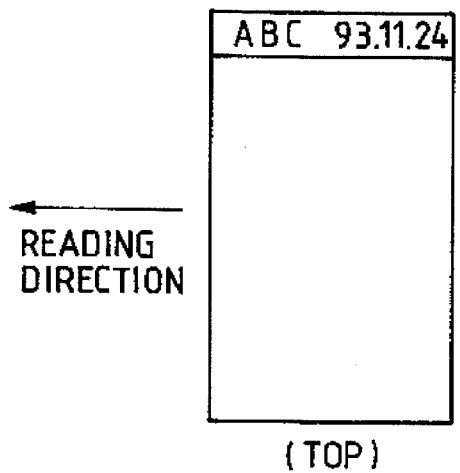
FIGS. 12A to 12D illustrate the addition of sending station information in the fourth embodiment.
Figure 12B:
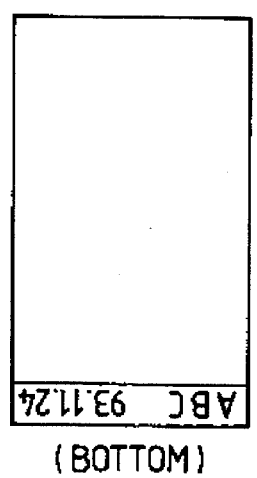
Figure 12C:
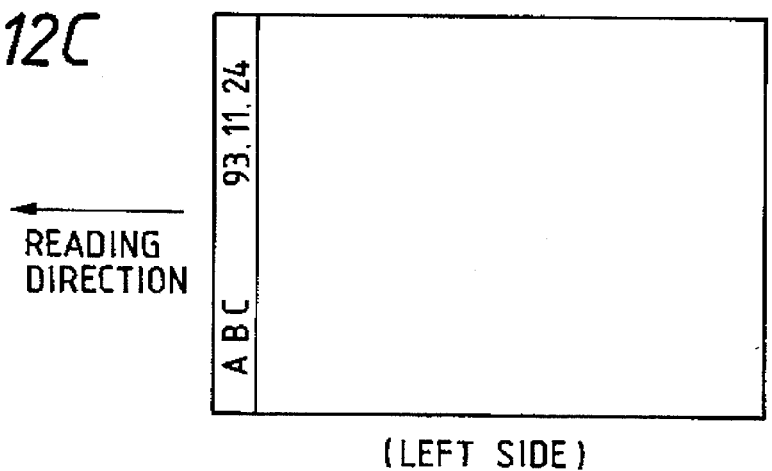
Figure 12D:
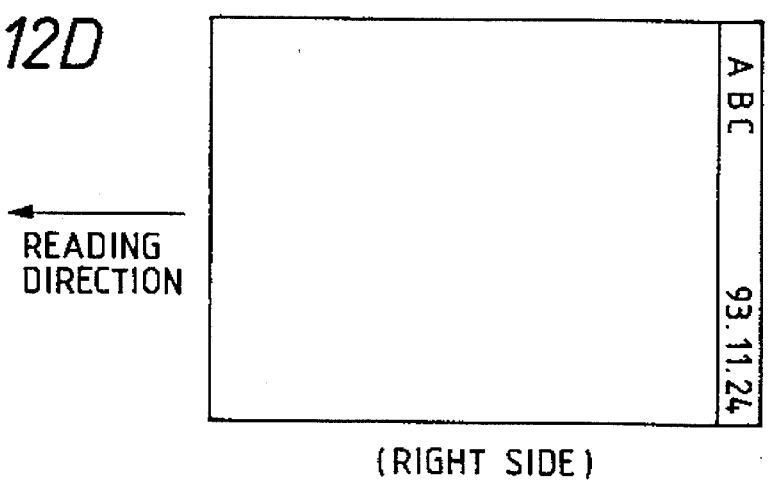

A dot pattern signal is outputted to a signal line 1012a such that when the setting of the addition mode of the sending station information by a signal line 1054c is the top, the sending station information is added at the position and in the direction as shown in FIG. 12A, when the setting is the bottom, it is added as shown in FIG. 12B, when the setting is the left, it is added as shown in FIG. 12C, and when the setting is the right, it is added as shown in FIG. 12D. When the signal level '0' is outputted to the signal line 1054c, the sending station information generation circuit 1012 does not output the sending station information to a signal line 1012a.

An adder circuit 1014 receives the information outputted on the signal lines 1010a and 1012a, adds them and outputs a sum to a signal line 1014a.

An encoder circuit 1016 receives the information outputted to the signal line 1014a and outputs encoded data (by the MR encoding with K=8) to a signal line 1016a.

A memory circuit 1018 stores the encoded data outputted to the signal line 1016a under the control of a signal line 1054d and outputs the stored encoded data to a signal line 1018a.

A decoder/variable magnifier/encoder circuit 1020 receives the signal outputted to the signal line 1018a, decodes it once as required to change the magnification, and encodes it. The encoded data is outputted to a signal line 1020a.

A modulator 1022 modulates a signal in accordance with the known CCITT Recommendation V27 ter (differential phase modulation) or V29 (quadrature modulation). The modulator 1022 receives and modulates the signal on the signal line 1020a and outputs the modulated data to a signal line 1022a.

An adder circuit 1024 receives the signals on the signal lines 1008a and the signal line 1022a, adds them and outputs a sum to a signal line 1024a.

A demodulator 1026 demodulates a signal in accordance with the known CCITT Recommendation V21. The demodulator 1026 receives the signal on the signal line 1006, V21 demodulates it and outputs the demodulated data to a signal line 1026a.

A demodulator 1028 demodulates a signal in accordance with the known CCITT Recommendation V27 ter (differential phase modulation) or V29 (quadrature modulation). The demodulator 1028 receives the signal on the signal line 1006a, demodulates it and outputs the demodulated signal to a signal line 1028a.

A decoder/encoder circuit 1030 receives the demodulated data outputted to the signal line 1028a, decodes it once, outputs the decoded data to a signal line 1030a and outputs the data. MR encoded with K=8 to a signal line 1030b.

A memory circuit 1032 stores the encoded data outputted to the signal line 1030b under the control of a signal line 1054e, and outputs the data stored in the memory circuit 1032 to a signal line 1032a under the control of the signal line 1054e.

A decoder circuit 1034 receives the signal outputted to the signal line 1032a and outputs the decoded (by the MR decoding with K=8) data to a signal line 1034a.

A record circuit 1036 is an LBP which receives the data outputted to the signal line 1034a and sequentially records it line by line at a constant speed.

A detection circuit 1038 detects a size of the document sheet set on a document sheet table. When the A4 document sheet is set, it outputs the signal level '0' on a signal line 1038a, and when the A3 document sheet is set, it outputs the signal level '1' to the signal line 1038a.

A registration circuit 1040 registers the position at which the sending station information is to be added for the document sheet size. When the information is to be registered in the registration circuit 1040, A4, space, U (representing the top): A3, space, L (representing the light) are sequentially outputted to a signal line 1040a, and a write pulse is generated on a signal line 1054f. On the other hand, when the information registered in the registration circuit is to be read, a read pulse is generated on a signal line 1054g. Thus, the information registered in the registration circuit 1040 (A4, space, U: A3, space, L) is outputted to the signal line 1040a.

A position registration button 1042 is for registering the position of the sending station information to be added for the document sheet size. When the button 1042 is depressed, a depression pulse is produced on a signal line 1042a.

A ten-key 1044 comprises numerical keys '0' to '9' and a key '*' and the depressed ten-key information is outputted to a signal line 1044a.

A set key 1046 indicates the determination of the key entry. When the key 1046 is depressed, a depression pulse is produced on a signal line 1046a.

A selection key 1048 selects the top, bottom, left or right. When the key 1048 is depressed, a depression pulse is produced on a signal line 1048a.

A selection key 1050 selects A4 or A3. When the key 1050 is depressed, a depression pulse is produced on the signal line 1050a.

A display unit 1052 receives the information outputted to a signal line 1054h and displays it.

In the present embodiment, the control circuit 1054 primarily controls the addition of the sending station information in accordance with the information of the position to add the sending station information for the document sheet size registered in the registration circuit 1040. A default is the addition of the sending station information at the top for the A4 document sheet, and the addition of the sending station information on the left for the A3 document sheet. In the present embodiment, the sizes of the document sheet which can be read are A4 and A3, and the length which can be read is 297 mm, and the image signal is transmitted without rotation.

Figure 13:
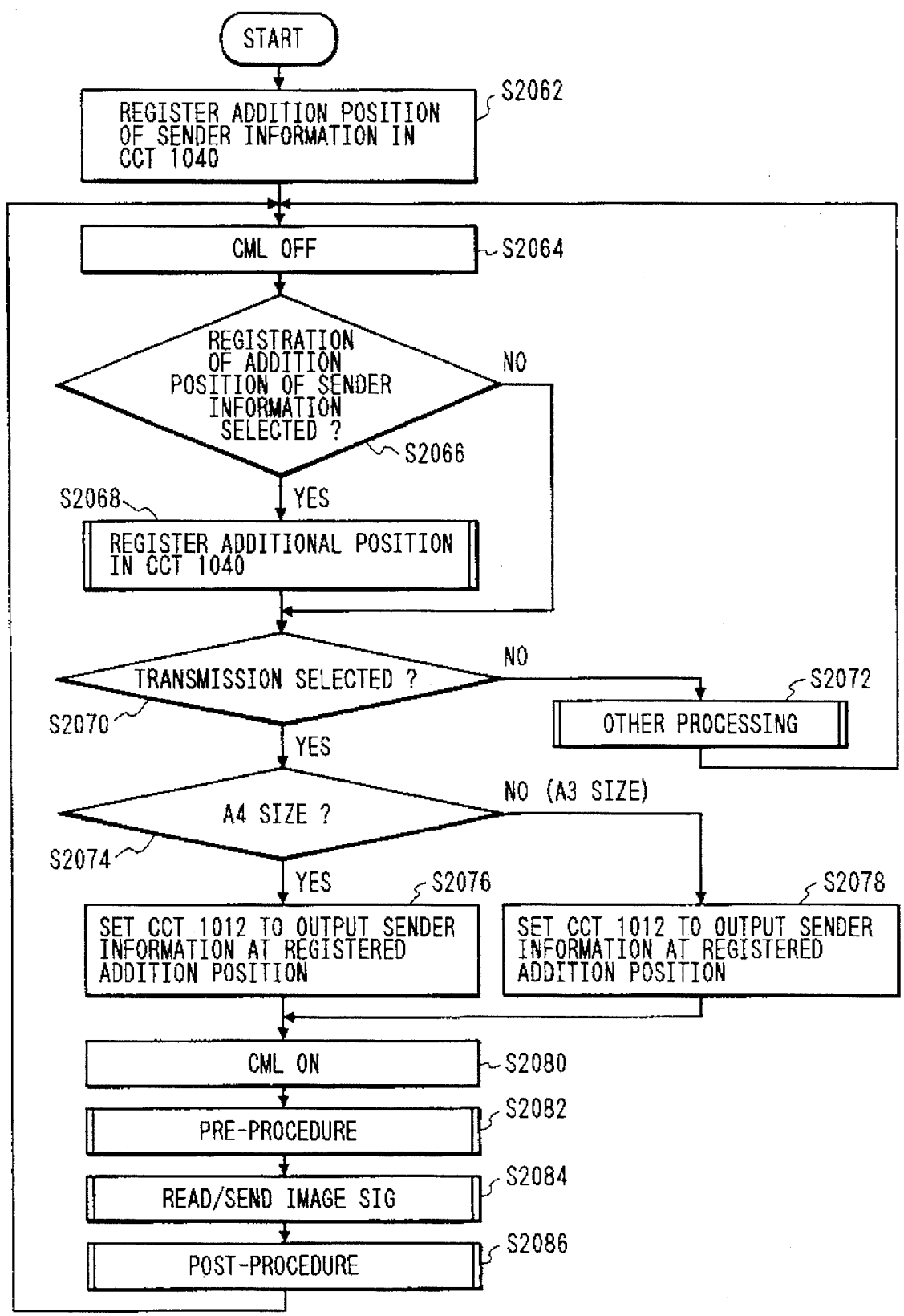
FIG. 13 shows a flow chart of a sending operation in the fourth embodiment.

FIG. 13 shows a flow chart of a transmission operation in the present embodiment.

In S2062, the addition of the sending station information at the top for the A4 document sheet and on the left for the A3 document sheet is registered in the registration circuit 1040 as a default. This is conducted by the control circuit 1054 as an initialization program.

In S2064, the signal level '0' is outputted to the signal line 1054a to turn off the CML. In S2066, whether the position at which the sending station information is to be added for the document sheet size has been selected or not is determined.

When the registration is selected, the process proceeds to S2068 to register the position of the addition of the sending station information for the document sheet size is registered in the registration circuit 1040.

In this process, an operator depresses the position registration button 1042 to display "Enter position on A4 sheet" on the display unit 1052. In response thereto, the operator enters '0' if the sending station information is not to be added, '1' if it is to be added at the top, '2' if it is to be added at the bottom, '3' if it is to be added on the left, and '4' if it is to be added on the right. Then, the operator depresses the set key 1046 to display "Enter position on A3 sheet" on the display unit 1052. In response thereto, the operator enters '0' if the sending station information is not to be added, '1' if it is to be added at the top, '2' if it is to be added at the bottom, '3' if it is to be added on the left, and '4' if it is to be added on the right. Finally, the operator depresses the set key 1046 to register the addition or non-addition of the sending station information for the A4 sheet and the A3 sheet and the position of the addition into the registration circuit 1040.

When the registration is not selected, the process proceeds to S2070 to determine whether the transmission has been selected or not. If the transmission is selected, the process proceeds to S2074, and if the transmission is not selected, other process is conducted in S2072.

In S2074, whether the document sheet set on the document sheet table is A4 or A3 is determined. When it is A4, the process proceeds to S2076, and when it is A3, the process proceeds to S2078.

In S2076, the position at which the sending station information for the A4 sheet is read from the registration circuit 1040, the outputting of the sending station information and the position of the addition are set in the sending station information generation circuit 1012. A default is the addition of the sending station information at the top.

In S2078, the position at which the sending station information is to be added for the A3 document sheet is read from the circuit 1040 and the outputting of the sending station information and the position of the addition are set in the sending station information generation circuit 1012. A default is the addition of the sending station information on the left.

In S2080, the signal level '1' is outputted to the signal line 1054a to turn on the CML. In S2082, a pre-protocol is conducted. In S2084, the image signal is read and transmitted. The reading of the image is effected with 297 mm for both A4 and A3 so that the information length along the main scan direction is 297 mm for both cases. The read information is transmitted as it is without rotation for both A4 and A3.

Then, in S2086, a post protocol is conducted.

Figure 14:
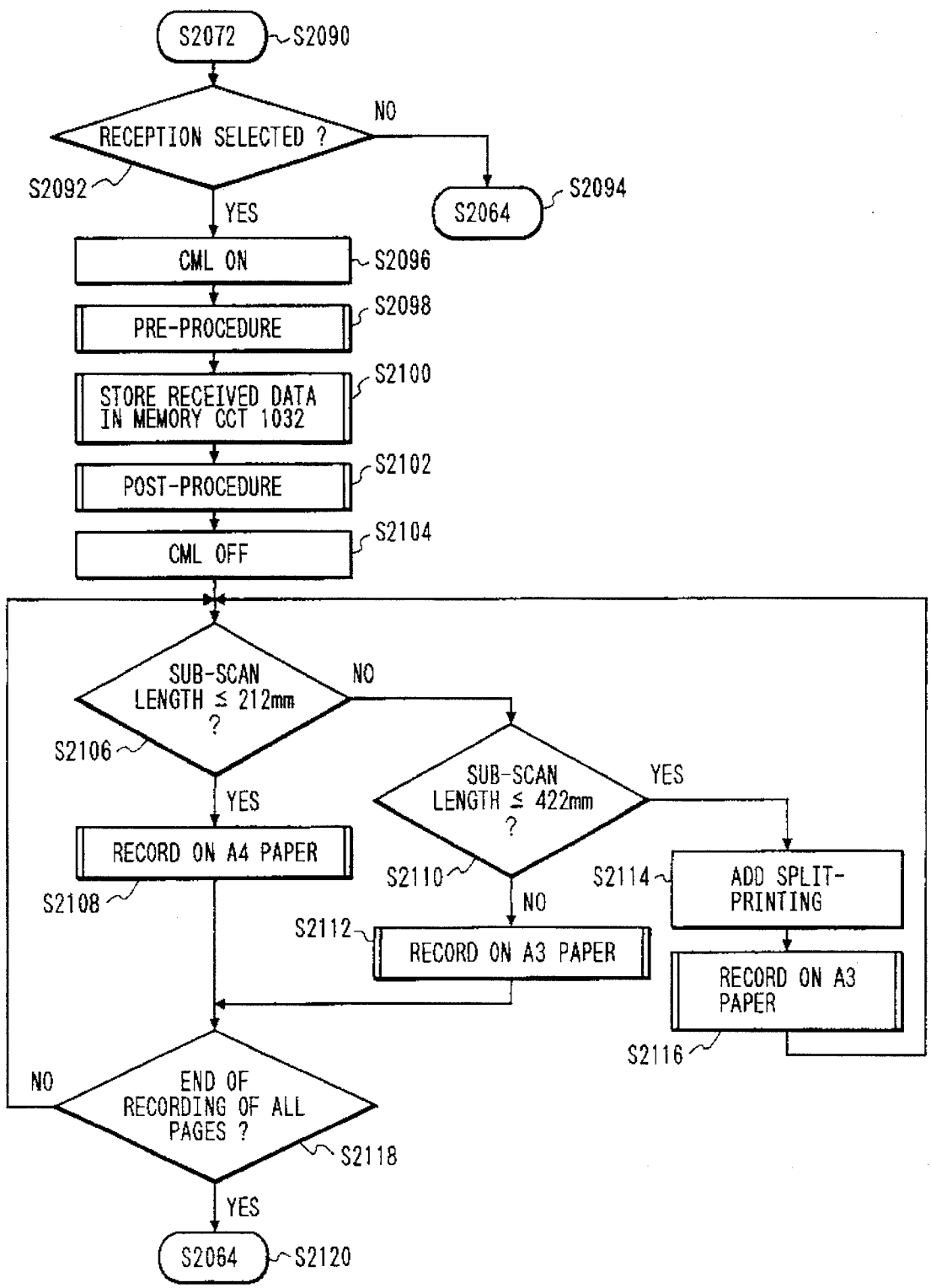
FIG. 14 shows a flow chart of a receiving operation in the fourth embodiment.

FIG. 14 shows a flow chart of a receiving operation in the present embodiment.

In the present embodiment, as shown in FIG. 10, a record length in the receiving station is 297 mm and the received information is recorded without rotation and the A4 record sheet or the A3 record sheet is selected by the length along the sub-scan direction for recording.

The process of FIG. 14 is included in the other process in S2072 of FIG. 13 (S2090). In S2092, whether the reception has been selected or not is determined. When the reception is selected, the process proceeds to S2096, and when the reception is not selected, the process proceeds to S2094 (corresponding to S2064).

In S2096, the signal level '1' is outputted to the signal line 1054a to turn on the CML. In S2098, a pre-protocol is conducted. In S2100, the information is stored in the memory circuit 1032. The main scan length is 297 mm and the sub-scan length is counted. Thereafter, in S2102, a post protocol is conducted. In S2104, the signal level '0' is outputted to the signal line 1054a to turn off the CML.

Then, in S2106, whether the sub-scan length is no larger than 212 mm or not is determined. If it is no larger than 212 mm, the process proceeds to S2110 to conduct the recording on the A4 cut sheet, and if it is larger than 212 mm, the process proceeds to S2108.

In S2108, whether the sub-scan length is no larger than 422 mm or not is determined. If it is no larger than 422 mm, the process proceeds to S2112 to conduct the recording on the A3 cut sheet. If it is larger than 422 mm, the process proceeds to S2114.

In S2110, the recording on the A4 record sheet is conducted. The recording on the A4 record sheet is conducted by conducting the recording of 297 mm for a predetermined number of lines. Then, the process proceeds to S2118.

In S2112, the recording on the A3 record sheet is conducted. The recording on the A3 record sheet is conducted by conducting the recording of 297 mm for a predetermined number of lines. Then, the process proceeds to S2118.

In S2114, the split of the printing is added to the record sheet. In S2116, the recording on the A3 record sheet is conducted. The sub-scan length is 420 mm less. Then, the process returns to S2106.

In S2118, whether all pages have been recorded or not is determined. If all pages have been recorded, the process proceeds to S2120 (corresponding to S2064), and if all pages have not been recorded, the process proceeds to S2106.

Figure 15A:
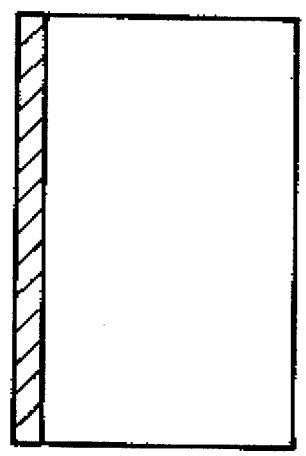
FIGS. 15A and 15B illustrate the addition of the sending station information in a prior art apparatus.
Figure 15B:
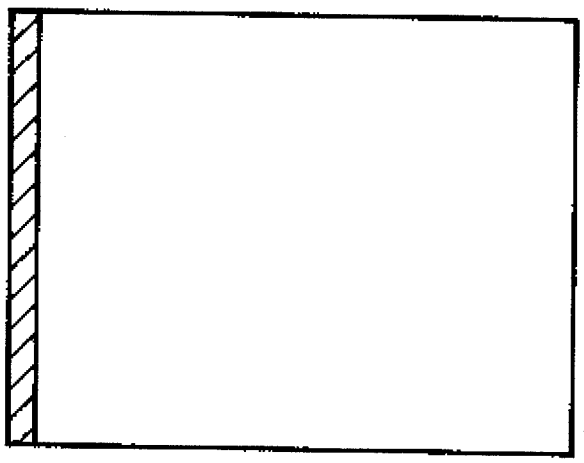

FIGS. 15A and 15B show the addition of the sending station information. FIG. 15A is for the recording on the A4 record sheet and FIG. 15B is for the recording on the A3 record sheet. A hatched area shows the sending station information.

In accordance with the present embodiment, in the facsimile apparatus which can read and record the A4 sheet and the A3 sheet, the A4 sheet is read or recorded from the longitudinal side, and the A3 sheet is read or recorded from the lateral side, and the sending station information is added at the top for the A4 sheet and on the left for the A3 sheet. Thus, the sending station information can be added at the proper position. The main scan length for reading is 297 mm for both the A4 sheet and the A3 sheet, and when it is transmitted with the main scan length of 297 mm, the receiving station can properly select the A4 record sheet or the A3 record sheet.

While the reading and the recording for the A4 sheet and the A3 sheet have been described in the above embodiments, the present invention is equally applicable to other sheet sizes. The process shown in the above embodiments may be applied only for the reading.

In accordance with the present invention, in the facsimile apparatus which can set a plurality of sizes of document sheets, the control means for changing the position of the sending station information to be added to the document sheet is provided, and the size of the sheet is recognized and the sending station information is properly added relative to the record direction.

What is claimed is:

1. A facsimile apparatus capable of setting a plurality of sizes of a document, comprising:

input means for inputting document information;

transmitting means for transmitting (1) document information input by said input means and (2) sending station information; and control means for changing, in transmission by said transmission means, a position of sending station information to be added to document information in accordance with the size of the document.

2. A facsimile apparatus according to claim 1 further comprising:

registration means for registering the position of the sending station information to be added to the document information in accordance with the size of the document, whereby the sending station information is added in accordance with the registered information.

3. A facsimile apparatus according to claim 1 wherein the image information is transmitted as it is without rotation.

4. A facsimile apparatus according to any one of claims 1 to 3 wherein a size An document and a size An+1 document are assumed, and a read length is defined by a length of a longitudinal side of the size An document.

5. A facsimile apparatus according to claim 4 wherein the record length is defined by the length of the longitudinal side of the size An document, the received information is recorded without rotation, and a size An record or a size An+1 record is selected for recording in accordance with a length of sub-scan.

6. A method for a facsimile apparatus capable of setting a plurality of sizes of a document, comprising the steps of:

inputting document information;

transmitting (1) document information input in said input step and (2) sending station information; and changing, for transmission in said transmission step, a position of sending station information to be added to document information in accordance with the size of the document.

* * * * *